(12) United States Patent
Adams

(10) Patent No.: US 9,075,192 B2
(45) Date of Patent: Jul. 7, 2015

(54) OPTICAL WAVEGUIDE SPLITTER

(71) Applicant: Finisar Sweden AB, Jarfalla (SE)

(72) Inventor: Dave Adams, Stockholm (SE)

(73) Assignee: FINISAR SWEDEN AB, Jarfalla (SE)

( * ) Notice: Subject to any disclaimer, the term of this patent is extended or adjusted under 35 U.S.C. 154(b) by 253 days.

(21) Appl. No.: 13/625,033

(22) Filed: Sep. 24, 2012

(65) Prior Publication Data

US 2014/0086522 A1   Mar. 27, 2014

(51) Int. Cl.
*G02B 6/28* (2006.01)
*G02B 6/125* (2006.01)

(52) U.S. Cl.
CPC .............. *G02B 6/125* (2013.01); *G02B 6/2813* (2013.01)

(58) Field of Classification Search
CPC ..................................................... G02B 6/2813
USPC ................................................................ 385/3
See application file for complete search history.

(56) References Cited

U.S. PATENT DOCUMENTS

| | | | |
|---|---|---|---|
| 5,799,119 | A | 8/1998 | Rolland et al. |
| 7,174,080 | B2 | 2/2007 | Walker |
| 7,184,207 | B1 | 2/2007 | Walker et al. |
| 2003/0152324 | A1 | 8/2003 | Betty et al. |
| 2004/0131310 | A1* | 7/2004 | Walker ............................ 385/29 |
| 2011/0064360 | A1* | 3/2011 | Jeong ............................... 385/39 |
| 2013/0223790 | A1* | 8/2013 | Jones et al. ...................... 385/14 |
| 2014/0086522 | A1* | 3/2014 | Adams ............................... 385/3 |

FOREIGN PATENT DOCUMENTS

| | | |
|---|---|---|
| GB | 2367904 A | 4/2002 |
| GB | 2486011 A | 6/2012 |

OTHER PUBLICATIONS

International Search Report, dated Jan. 24, 2014, from corresponding PCT application.
Written Opinion, dated Jan. 23, 2014, from corresponding PCT application.

* cited by examiner

*Primary Examiner* — Rhonda Peace
(74) *Attorney, Agent, or Firm* — Young & Thompson

(57) ABSTRACT

An optical waveguide splitter with a symmetric splitting power ratio having one input port and two output ports, includes a substrate and one or more vertical waveguide layers deposited thereon or diffused thereinto, and optionally one or more cladding layers deposited upon the waveguide layer(s). The waveguide layers and optionally one or more cladding layer together and optionally with the substrate form a profile of the refractive index that supports the propagation of light in a plane substantially parallel to the substrate. On both sides of the input port, the waveguide sidewalls terminate at a depth deeper than the location of the peak intensity of the beam transporting propagating light energy within the input port, and the sidewalls on both sides of each output port terminate at a depth shallower than the location of the peak intensity of the beam transporting the majority light energy within each output port.

20 Claims, 4 Drawing Sheets

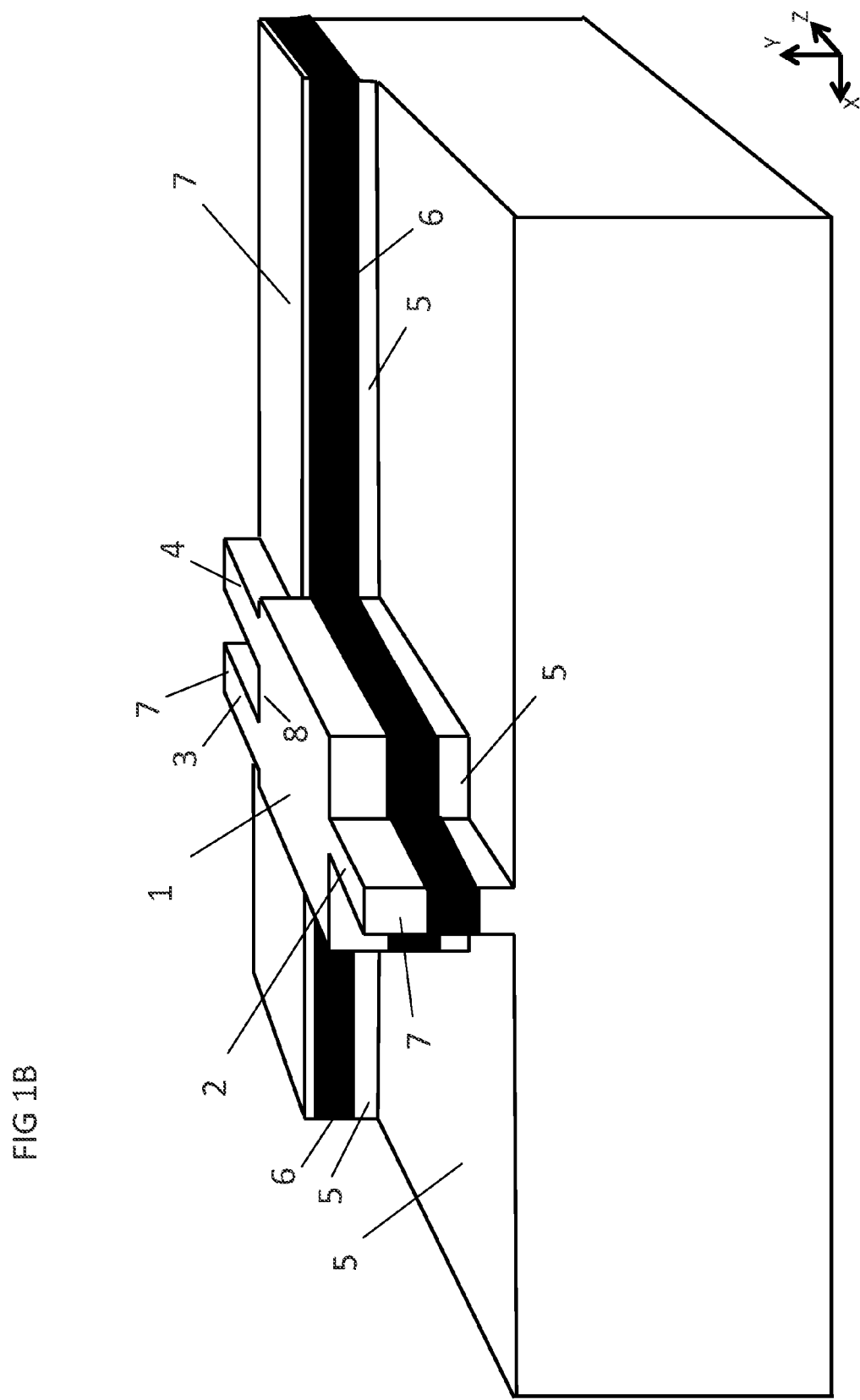

OPTICAL WAVEGUIDE SPLITTER

The present invention refers to an optical waveguide splitter.

In for example a data transmission product that utilizes a monolithically integrated tunable semiconductor laser and Mach Zehnder (inteferometric) modulator chip, light that is launched from the laser into the modulator is preferably divided equally into the two arms of the interferometer. A 1x2 MMI (Multi Mode Interference) type optical splitter is typically used to split the light evenly.

However, due to the manner of operation of the tunable laser, and/or due to unintentional consequences of the manner of fabrication of the integrated laser and modulator chip, light that is launched into the optical splitter sometimes contains a mix of the fundamental symmetric optical mode, along with some unwanted higher order mode light. Even a few percent of higher order mode light can seriously degrade the splitting symmetry of a 1x2 MMI type optical splitter. This constitutes a problem.

The present invention solves the said problem, and provides an optical waveguide splitter that maintains a substantially symmetric splitting power ratio, while also providing low back reflections, when the light that is launched into the splitter contains some unintentional higher order lateral mode contamination.

U.S. Pat. No. 7,174,080 teaches that a filter that includes a strongly guided rib waveguide section can be disposed to precede a 1xN MMI splitter, where this filter is designed to hinder the propagation of higher order bound radiation modes, by substantially blocking, or reflecting, or attenuating the bound higher order mode light energy, so that the higher order mode light energy is substantially prevented from transmission into the mode mixing region of the 1xN splitter. U.S. Pat. No. 7,174,080 also teaches that a preferred filter design is in the range of 150 um to 200 um in length, for a GaAs/Al$_{1-x}$Ga$_x$As semiconductor based optical integrated circuit that operates at a wavelength of substantially 1.5 um. U.S. Pat. No. 7,174,080 also teaches that the profile of the MMI region can optionally be modified to deflect higher order light energy sideways.

Conversely, a strongly guided input port according to the present invention is a waveguide that can be of any length (for example much shorter than 150 um), and this input port waveguide can freely support the substantially lossless propagation of higher order guided mode light radiation, and transmit this light into the mixing region, rather than block or reflect or attenuate the bound higher order mode radiation.

Furthermore, according to the present invention the influence of the guided higher order mode on the splitting ratio is largely suppressed without a requirement to modify the MMI region geometry or dimensions relative to the standard rectangular MMI dimensions that one would typically employ for a 1x2 or 1xN MMI type splitter design.

For these reasons, a 1x2 splitter according to the invention presented here is simpler to design and construct and is far more compact than a 1x2 splitter having the input filter taught by U.S. Pat. No. 7,174,080.

For the purposes of geometrical descriptions of the splitter, a Cartesian coordinate system will be used, where the X and Z axes are parallel to the plane of the substrate, and where the Z axis direction is chosen to be substantially parallel to the direction of light propagation within the splitter, as shown in FIG. 1 and FIG. 2.

In this coordinate system, the vertical (Y direction) waveguiding is typically predominantly determined by the profile of the refractive index of the different materials that may be disposed along the Y direction, and the strength and width of the lateral waveguide is predominantly determined by modifications or discontinuities of the profile of the refractive index along the X direction.

SUMMARY OF THE INVENTION

The present invention refers to an optical waveguide splitter with a symmetric splitting power ratio having one input port and two output ports, which waveguide splitter is a rectangular MMI (Multi Mode Interference) type splitter, comprising a substrate and one or more vertical waveguide layers or materials that have been deposited upon or diffused into the substrate, and optionally one or more cladding layers that have been deposited upon the vertical waveguide layer(s), which layers or materials and optionally one or more of said cladding layers together and optionally in combination with the substrate form a profile of the refractive index that supports the propagation of light in a plane that is substantially parallel to the substrate (parallel to the X and Z directions), and is characterized in that, on both sides of the input port, the waveguide sidewalls terminate at a depth (Y-direction) that is deeper than the location of the peak intensity of the optical beam or guided mode that transports most or all of the propagating light energy within the input port, and that the waveguide sidewalls on both sides of each output port terminate at a depth that is shallower than the location of the peak intensity of the mode or optical beam that transports the majority of the light energy within each given output port.

For the purposes of the description of this invention, a so-called 'waveguide layer' can also be understood to designate a stack of contiguous layers having a larger refractive index than the top and bottom vertical waveguide cladding layers.

For example in an InP/In$_{1-x}$Ga$_x$As$_y$P$_{1-y}$ integrated electro-optical circuit, the vertical waveguiding layer often consists of a stack of contiguous epitaxially deposited layers having different In$_{1-x}$Ga$_x$As$_y$P$_{1-y}$ alloy compositions, where the mole fractions x and y are not equal to zero, which together form a vertical waveguide, and which can behave for vertical waveguiding purposes substantially like a single waveguide layer having a thickness equal to the total thickness of that stack of contiguous layers, and a refractive index that is approximately equal to the thickness-weighted average of the refractive index of the individual In$_{1-x}$Ga$_x$As$_y$P$_{1-y}$ layers within the stack.

In cases where the vertical waveguiding is substantially determined by a single waveguide layer or a single stack of layers having a larger refractive index than the layers above or below the layer or stack of layers, the layers above and below the said vertical waveguiding layer or said stack of layers are typically called the cladding layers of the vertical waveguide. The cladding layers have a lower refractive index than the refractive index of the said vertical waveguiding layer or said stack of layers, so that the peak intensity of the vertical profile of the guided mode is typically situated within the said single vertical waveguiding layer or said stack of layers. Within the cladding layers, the vertical profile of the light energy diminishes approximately exponentially in the vertical directions away from the waveguide layer. In an electro optical circuit that has an In$_{1-x}$Ga$_x$As$_y$P$_{1-y}$ vertical waveguiding layer, the layers above and below (including the substrate) typically consist mainly or in some cases entirely of the binary semiconductor InP.

In optical circuits that comprise more than one waveguide layer or more than one contiguous stack of epitaxial layers in the vertical direction that have a higher refractive index than the refractive index of the layers above and below and between them, and where the layer(s) that is (are) disposed between them has (have) substantially the same refractive index as the cladding layers above and below, the waveguide layer can be understood to be a higher refractive index layer or a contiguous stack of layers within which the local intensity of the vertically guided light is the largest.

BRIEF DESCRIPTION OF THE DRAWINGS

The present invention is described below in more detail in connection with exemplifying embodiments and drawings, where FIG. 1B shows a schematic perspective view of an optical splitter, with a larger substrate than in FIG. 1, according to the invention

DETAILED DESCRIPTION OF THE PREFERRED EMBODIMENTS

In FIG. 1 an optical waveguide splitter, having a symmetric splitting power ratio, according to the invention, is shown.

The optical splitter 1 has one input port 2 and two output ports 3, 4. The optical splitter comprises a substrate and one or more vertical waveguide layers or materials that have been deposited upon or diffused into the substrate, and optionally one or more cladding layers that have been deposited upon the vertical waveguide layer(s), which layers or materials and optionally one or more of said cladding layers together and optionally in combination with the substrate form a profile of the refractive index that supports the propagation of light in a plane that is substantially parallel to the substrate (parallel to the X and Z directions), please see FIG. 1.

To start with the structure forming the splitter is grown in a well known way, whereafter parts of the structure are etched down to form the splitter 1.

The term "vertical waveguide layer" in the present specifica-tion and in the claims designates a layer that achieves the confinement of light in the vertical direction (Y-direction) of a waveguide, regardless of whether that layer is active or passive. A vertical waveguide layer or sequence of layers achieves the confinement of light in the y-direction. The more general term "waveguide" refers to a geometry and refractive index profile that provides light confinement in both the vertical and the lateral directions.

According to the invention it is characterized in that on both sides of the input port 2, the waveguide sidewalls terminate at a depth (Y-direction) that is deeper than the location of the peak intensity of the optical beam or guided mode that transports most or all of the propagating light energy within the input port, and in that the waveguide sidewalls on both sides of each output port 3, 4 terminate at a depth that is shallower than the location of the peak intensity of the mode or optical beam that transports the majority of the light energy within each given output port.

Figure 3A:
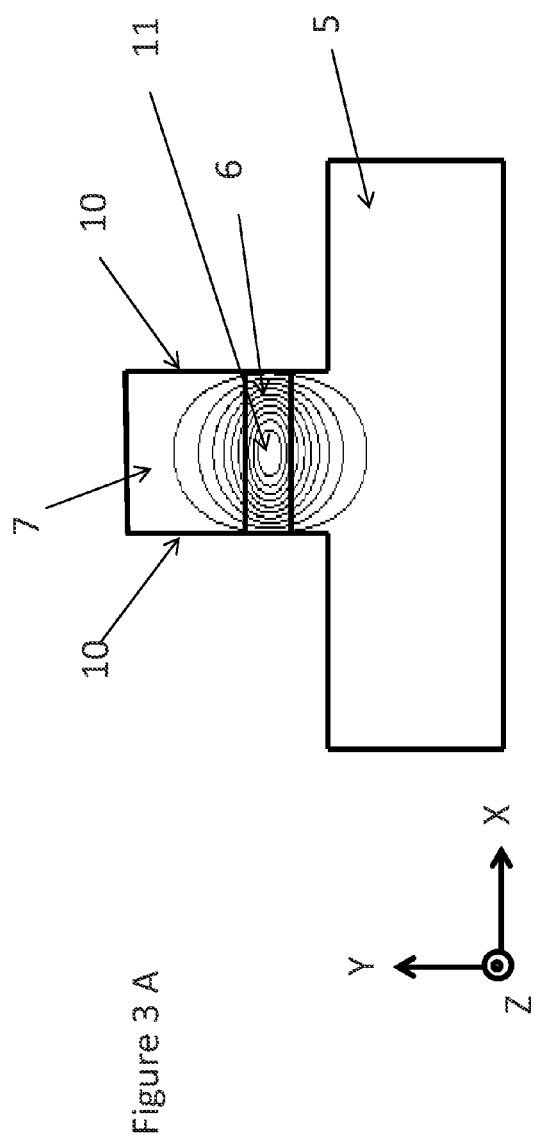
FIG. 3A illustrates the light intensity in a strongly guided input port
Figure 3B:
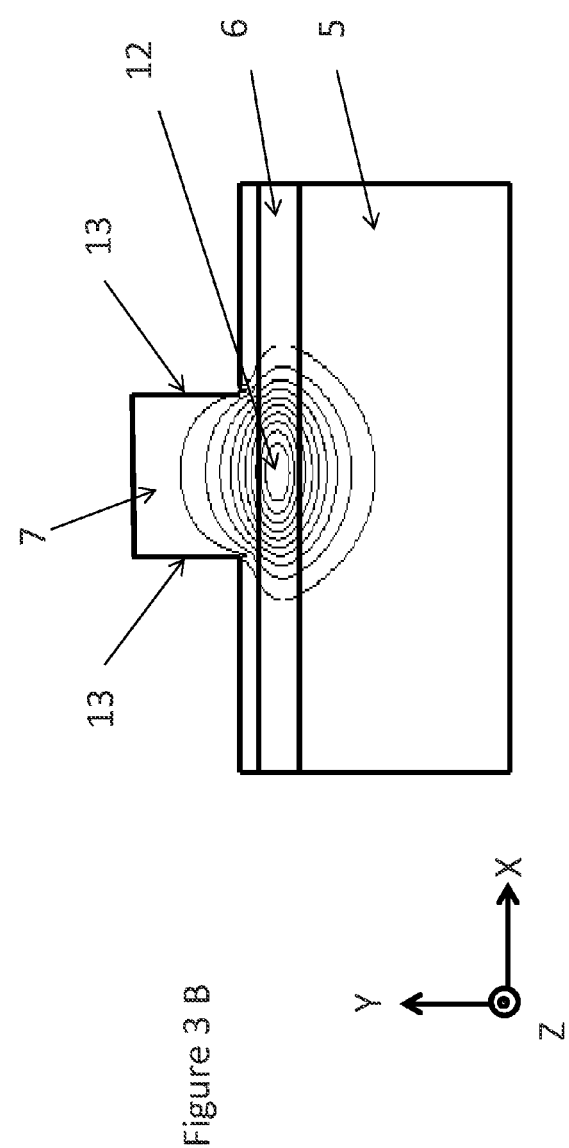
FIG. 3B illustrates the light intensity in a weakly guided output port

In order to illustrate the strong guidance at the input port 2 and the weaker guidance at the output ports 3, 4 reference is made to FIGS. 3A and 3B.

Referring to FIG. 1, FIG. 3A provides a cross-section in X and Y of the strongly guided input port. In FIG. 3A, the light propagates in the Z direction, which is out of the page, toward the viewer, and the contours represent the shape of the optical intensity profile of the strongly guided mode in the plane that is perpendicular to the light propagation direction. The peak of the optical intensity is indicated by the arrow 11, and successive contours represent contours of diminishing optical intensity. One can see that in this strongly guided input port 2, the waveguide sidewalls 10 terminate at a depth (Y-direction) that is deeper than the location of the peak of the intensity profile 11 of the guided mode.

FIG. 3B provides a cross-section in X and Y of one of the weakly guided output ports. In FIG. 3B, the light propagates in the Z direction, which is out of the page toward the viewer, and the contours represent the shape of the optical intensity profile of the weakly guided mode in the plane that is perpendicular to the light propagation direction. The peak of the optical intensity is indicated by the arrow 12, and successive contours represent contours of diminishing optical intensity. One can see that in this weakly guided output port 3, 4, the waveguide sidewalls 13 terminate at a depth that is shallower than the location of the peak of the intensity profile 12 of the guided mode.

The splitter 1 according to one embodiment comprises a substrate 5, a vertical waveguiding layer 6 upon the substrate and a top layer 7 upon the vertical waveguiding layer. The substrate 5 and the top layer 7 are preferably made of InP and the vertical waveguiding layer 6 is made of one or more $In_{1-x}Ga_xAs_yP_{1-y}$ alloys. However, other materials and layer combinations can be used. For example, the substrate 5 and the top layer 7 can contain additional layers for a variety of fabrication or operational purposes. Alternatively, the substrate could be made of Si and the vertical waveguiding layer 6 can then be made of $Si_xGe_{1-x}$. Even still other material and layer combinations can be used, as long as the material and layer combination supports at least one guided local normal mode for the propagation of light energy along the input port, and as long as the (possibly different) material and layer combinations in each output port support at least one guided local normal mode for the propagation of light in each of those ports.

The waveguide splitter is a rectangular MMI (Multi Mode Interference) type splitter having input and output ports with a constant width along the length of the respective port at least in the immediate vicinity where the ports are connected to the MMI region. In this particular example embodiment of the invention, the ports all have the same width, but in general the input and output ports do not necessarily all have the same width.

Figure 1A:
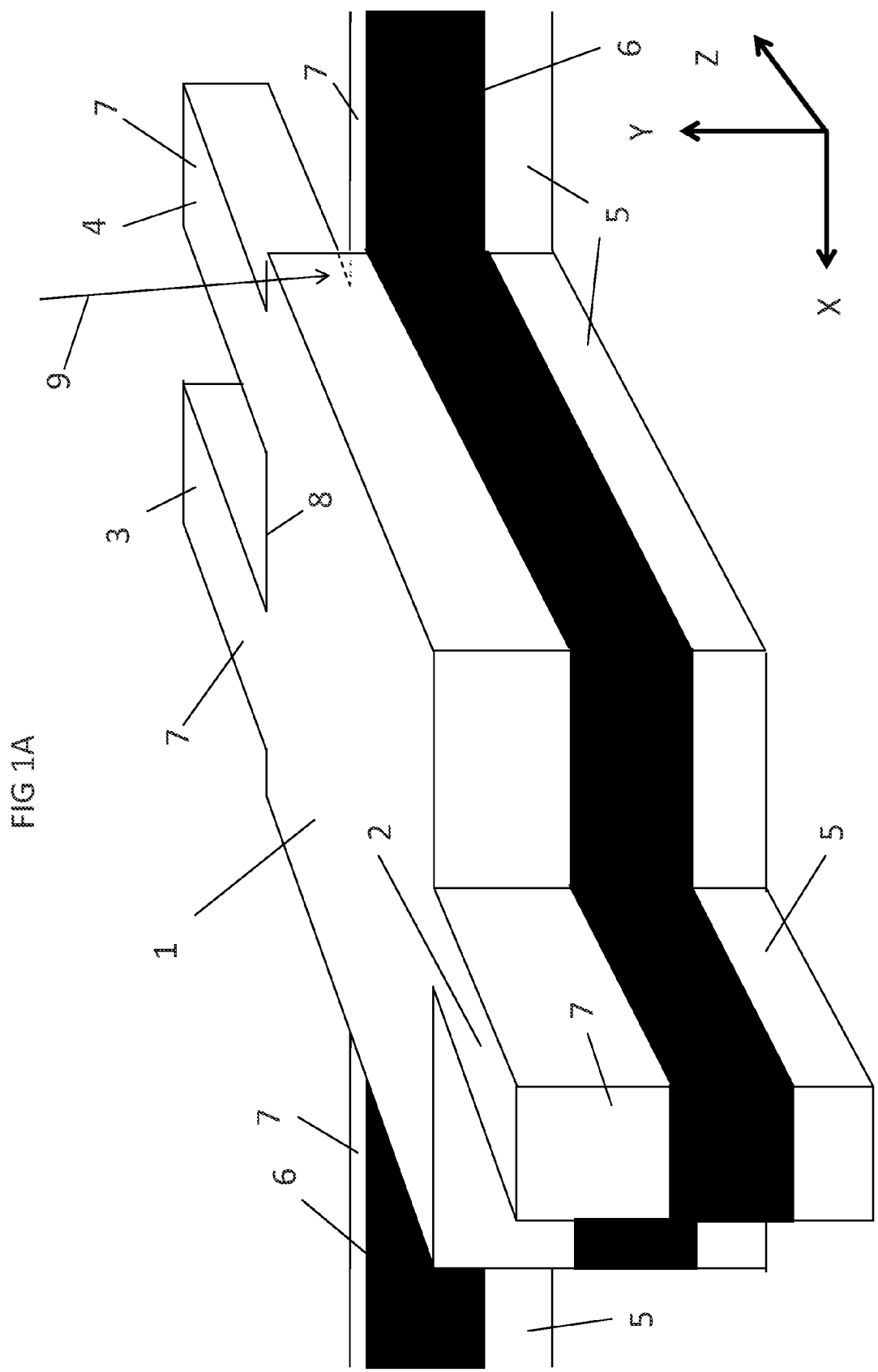
FIG. 1A shows a schematic perspective view of an optical splitter according to the invention

According to one embodiment shown in FIGS. 1A and 1B the waveguide 1 has been etched down on both sides of the input port 2 through both the top layer 7 and at least half of the vertical waveguiding layer, and on both sides of each of the output ports 3, 4 the waveguide 1 has been etched through a portion of, or all of, the top layer 7, but through less than half of the vertical waveguiding layer 6. In this embodiment, it is assumed that the vertical waveguide layer and the surrounding layers and geometry achieve a confinement of the light within the waveguide layer such that the location of the peak intensity is situated at the center of the waveguide layer thickness, in both the input port and output ports.

More specifically, in the particular example embodiment shown in FIG. 1, the etch that defines the input port has a depth that extends past the vertical waveguiding layer and into the substrate, and the etch that defines the output ports removes only a part of the top layer.

The dashed lines in FIG. 1A to which the arrow 9 points illustrates the depth to which the shallow etch is done. Thus, in this particular example embodiment, the shallow etch does not cut through the vertical waveguiding layer 6.

Thus, in this embodiment, the strong and weak guides and the MMI share a common top surface, and the weak guiding region is characterized by a shallower depth of the etch where the output port waveguide ridges are defined in that region.

In this way, the input port 2 of the splitter is very strongly confined laterally, relative to the direction of the light propagation, with a deeper etch, while the output ports 3, 4 are weakly guided laterally by a shallow etched ridge waveguide. This combination results in a drastic reduction of the influence of higher order mode input light on the split ratio of the splitter 1.

In some embodiments, the etched regions that define the input or output waveguide ridges, or the etched regions that define the MMI, may be filled with a material that has a refractive index that is lower than the refractive index of the vertical waveguiding layer material.

And in some other embodiments, the input port and output port waveguides could be defined by different fabrication methods. For example a waveguide input port having strong lateral guiding could be defined by the selective area epitaxial crystal growth of a vertically waveguiding layer sequence into a channel defined by a stripe shaped opening in dielectric film on the substrate. The same layer sequence could simultaneously be grown (without the dielectric film) in regions where the MMI region and output ports will be defined, and where the MMI and output port sidewalls could later be defined by a shallow etch for example.

A waveguide as shown in FIG. 1B may have the following dimensions. The waveguides may be 2 to 3 micrometers wide and tall. The MMI may be 10 microns wide and 107 microns long. One chip carrying the splitter may be 400 microns wide, 120 microns tall and 3500 microns long.

Figure 2:
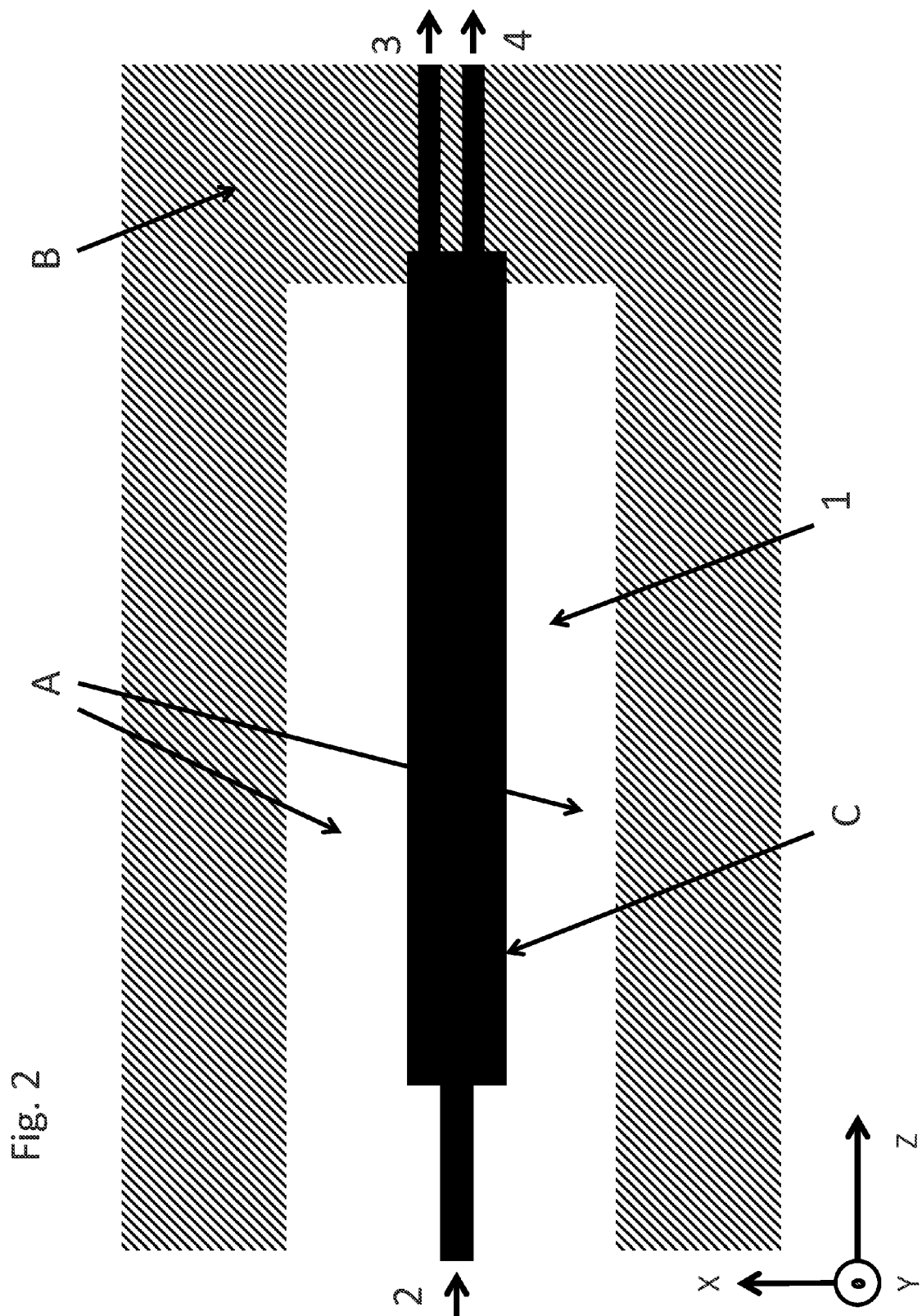
FIG. 2 shows different areas of the optical splitter as seen from above

In FIG. 2 different areas of the optical splitter as seen from above are shown. The areas marked A are deep etched. The area marked B is a shallow etched area. The black area C is an area that has not been etched.

Typically for $In_{1-x}Ga_xAs_yP_{1-y}$ based optical circuits, the thickness of the top layer may be 1-2.5 microns, preferably 2 microns, and the thickness of the vertical waveguiding layer 6 may be 0.15-0.40 microns, and the thickness of the substrate 5 may be about 120 microns, and the width of the substrate for one optical circuit is typically 200 to 1000 microns.

Preferably, the 1x2 or 1xN MMI splitter (where N is an even number) is designed to operate in the restricted symmetric regime. In this design regime, the light is launched substantially along the central axis of the MMI. The preferred length of the MMI is $(1/N)*(3*L_{pi}/4)$, where $L_{pi}$ is approximately equal to $(4 \times Nguide \times Weff^2)/(3 \times lambda0)$, where lambda0 is the free space radiation wavelength, where Nguide is the effective refractive index of light that is propagating within the vertical 1-D slab mode that corresponds to the given combination of vertical waveguide and cladding layers, and where Weff is the effective optical width of the MMI, which is approximately equal to the physical width of the MMI in the case of a MMI having strongly guiding sidewalls. In a 1x2 MMI restricted symmetric splitter, the two output port centerlines are each symmetrically displaced laterally from the MMI centerline by Weff/4.

As an example of a preferred embodiment, for an effective MMI width of 10.1 microns, and a 0.36 micron thick vertical waveguide layer of $In_{0.78}Ga_{0.22}As_{0.48}P_{0.52}$ that is clad above and below by InP, which corresponds to a slab vertical waveguide mode effective index of 3.252, the appropriate MMI design length is 107 microns, and the separation between the centers of the output port waveguides is 5.1 microns.

For a conventional 1x2 rectangular MMI having the dimensions given above, and having identical weakly guided ridge waveguide input and output ports that are 2.4 microns wide, defined by a shallow etch that terminated 0.05 microns above the vertical waveguiding layer, the power coupling between a launched $1^{st}$ higher order mode at the input port to the first asymmetric composite mode, also called the first asymmetric super mode, of the output waveguide pair, is 48%. Conversely if the input guide is instead deeply vertically etched past the waveguide layer to make it strongly guided, the coupling to the output asymmetric super mode is drastically reduced from 48% for the weakly guided input port case to 1.4%. In this example, equal input and output port waveguide widths have been utilized, but unequal waveguide widths can also be utilized.

Under ideal operation of a 1x2 splitter, only the fundamental mode, and no higher order bound mode, is propagating within the input port. Under these conditions, only the symmetric output super mode is excited at the output port pair, which corresponds to equal launched power in the two output ports and therefore symmetric splitting. However, if there is a small amount of power in the $1^{st}$ asymmetric bound higher order mode at the input port, then this light will couple to the asymmetric super mode of the weakly guided output waveguide pair, which is a mode having light that is 180 degrees out of phase in the two output ports, and which can therefore inter-fere strongly with the symmetric super mode light in the output port pair, and this interference can heavily distort the splitting ratio from 1.

The reduction in the power coupling from bound first higher order mode in the input port to the first asymmetric output super mode from 48% to 1.4% with the example embodiment described here results in a drastic decrease in the ability of unintentional guided higher order mode light in the input port to affect the splitting ratio.

The present optical splitter 1 can also achieve a very low optical reflection from the end wall 8 of splitter 1 back to a laser or any other optical component that is coupled to the input port 2. The reflection can be very low, because with weakly guided output ports of the type that have been described in the preferred embodiment, the vertical waveguiding layer, within which most of the light energy is typically propagating, has not been etched anywhere along the flat output endwall of the MMI.

Large Reflections can perturb or in some cases ruin the laser operation, and reflections can also impair the performance of other integrated or discrete optical components that may be coupled to the 1x2 splitter, such as a wavelength filter or semiconductor optical amplifier, for example. Accordingly it is desirable to minimize any reflections from the 1x2 splitter, and the weak output waveguide geometry of the type that has been described in the preferred embodiment can achieve a massive reduction in reflectivity when compared with the use of deeply etched output waveguides, particularly when a rectangular MMI geometry is employed.

The robustness of the equal power splitting properties of the present splitter, in combination with the low reflectivity, are essential to manufacturably attain performance specifications of associated transmitter products.

Thus, the present invention gives a far more effective optical splitter.

The present invention also has an important utility for standalone inteferometric modulator products, or more gener-ally for optical integrated circuits having no integrated laser. Specifically, this invention can be employed to minimize impairments on the split ratio, and to simultaneously minimize back reflections, when there is an unintentional misalignment of either an external laser or the optics that are used to couple the laser light into a modulator, or into any other optical integrated circuit that includes a 1x2 splitter.

According to a preferred embodiment the splitter is a 1x2 MMI (Multi Mode Interference) type splitter that is designed to operate in the restricted symmetric regime.

According to another preferred embodiment the optical waveguide splitter 1 is monolithically integrated with a semiconductor laser.

According to an alternative embodiment the optical waveguide splitter 1 is disposed within a standalone interferometric modulator.

According to still another alternative embodiment the optical waveguide splitter 1 is disposed within an optical or electro optical integrated circuit.

It is apparent that the present invention solves the above mentioned problem.

Several embodiments have been described above. However, the invention shall not be restricted to the said embodiments, but may be varied within the scope of the claims.

The invention claimed is:

1. An optical waveguide splitter (1) with a symmetric splitting power ratio having one input port (2) and two output ports (3,4), which waveguide splitter is a rectangular Multi Mode Interference (MMI) type splitter, comprising:
   a substrate (5); and
   one or more vertical waveguide layers or materials that have been deposited upon or diffused into the substrate (6), said layers or materials forming a profile of the refractive index that supports the propagation of light in a plane that is substantially parallel to the substrate (parallel to the X and Z directions),
   wherein said waveguide splitter contains one input waveguide and two output wave guides only,
   wherein, on both sides of the input port (2), waveguide sidewalls terminate at a depth (Y-direction) that is deeper than a location of a peak intensity of the optical beam or guided mode that transports most or all of the propagating light energy within the input port,
   wherein waveguide sidewalls on both sides of each output port (3, 4) terminate at a depth that is shallower than the location of the peak intensity of the mode or optical beam that transports the majority of the light energy within each given output port, and
   wherein the optical waveguide splitter (1) is monolithically integrated with a semiconductor laser.

2. The optical waveguide splitter (1) according to claim 1, wherein, on both sides of the input port (2) the waveguide splitter (1) has been etched down at least through a top layer (7) and at least half of the vertical waveguide layer (6), and
   wherein on both sides of each of the output ports (3,4) the waveguide splitter (1) has been etched down through a portion of, or all of the top layer (7) but through less than half of the vertical waveguide layer (6).

3. The optical waveguide splitter (1) according to claim 2, wherein the splitter (1) is a 1x2 MMI (Multi Mode Interference) type filter.

4. The optical waveguide splitter (1) according to claim 2, wherein output waveguides (3, 4) have no sidewalls, and a lateral extent of each output waveguide are defined by a modification of the profile of the refractive index by a dopant or vacancy diffusion process, or by an ion implantation or quantum well intermixing procedure.

5. The optical waveguide splitter (1) according to claim 2, wherein a MMI region rectangular profile is modifiable in areas that are substantially removed from the areas and interfaces where light propagates and reflects, to facilitate photolithographic mask alignment or other aspects of circuit fabrication, utilization, or appearance.

6. The optical waveguide splitter (1) according to claim 2, wherein the optical waveguide splitter (1) is disposed at the input of a standalone interferometric modulator.

7. The optical waveguide splitter (1) according to claim 2, wherein the optical waveguide splitter (1) is disposed at the input of or within an optical or electro optical integrated circuit.

8. The optical waveguide splitter (1) according to claim 1, wherein the splitter (1) is a 1x2 MMI type filter.

9. The optical waveguide splitter (1) according to claim 8, wherein output waveguides (3, 4) have no sidewalls, and a lateral extent of each output waveguide are defined by a modification of the profile of the refractive index by a dopant or vacancy diffusion process, or by an ion implantation or quantum well intermixing procedure.

10. The optical waveguide splitter (1) according to claim 8, wherein a MMI region rectangular profile is modifiable in areas that are substantially removed from the areas and interfaces where light propagates and reflects, to facilitate photolithographic mask alignment or other aspects of circuit fabrication, utilization, or appearance.

11. The optical waveguide splitter (1) according to claim 1, wherein output waveguides (3, 4) have no sidewalls, and a lateral extent of each output waveguide are defined by a modification of the profile of the refractive index by a dopant or vacancy diffusion process, or by an ion implantation or quantum well intermixing procedure.

12. The optical waveguide splitter (1) according to claim 11, wherein a MMI region rectangular profile is modifiable in areas that are substantially removed from the areas and interfaces where light propagates and reflects, to facilitate photolithographic mask alignment or other aspects of circuit fabrication, utilization, or appearance.

13. The optical waveguide splitter (1) according to claim 1, wherein a MMI region rectangular profile is modifiable in areas that are substantially removed from the areas and interfaces where light propagates and reflects, to facilitate photolithographic mask alignment or other aspects of circuit fabrication, utilization, or appearance.

14. The optical waveguide splitter (1) according to claim 1, wherein the optical waveguide splitter (1) is disposed at the input of a standalone interferometric modulator.

15. The optical waveguide splitter (1) according to claim 1, wherein the optical waveguide splitter (1) is disposed at the input of or within an optical or electro optical integrated circuit.

16. An optical waveguide splitter (1) with a symmetric splitting power ratio having one input port (2) and two output ports (3,4), which waveguide splitter is a rectangular Multi Mode Interference (MMI) type splitter, comprising:
   a substrate (5); and
   one or more vertical waveguide layers or materials that have been deposited upon or diffused into the substrate (6), said layers or materials forming a profile of the refractive index that supports the propagation of light in a plane that is substantially parallel to the substrate (parallel to the X and Z directions),
   wherein said waveguide splitter contains one input waveguide and two output wave guides only,
   wherein, on both sides of the input port (2), waveguide sidewalls terminate at a depth (Y-direction) that is deeper than a location of a peak intensity of the optical beam or guided mode that transports most or all of the propagating light energy within the input port, wherein waveguide sidewalls on both sides of each output port (3, 4) terminate at a depth that is shallower than the location of the peak intensity of the mode or optical beam that transports the majority of the light energy within each given output port, and wherein output waveguides (3, 4) have no sidewalls, and a lateral extent of each output waveguide are defined by a modification of the profile of the refractive index by a dopant or vacancy diffusion process, or by an ion implantation or quantum well intermixing procedure.

17. The optical waveguide splitter (1) according to claim 16, wherein a MMI region rectangular profile is modifiable in areas that are substantially removed from the areas and interfaces where light propagates and reflects, to facilitate photolithographic mask alignment or other aspects of circuit fabrication, utilization, or appearance.

18. The optical waveguide splitter (1) according to claim 16,
wherein, on both sides of the input port (2) the waveguide splitter (1) has been etched down at least through a top layer (7) and at least half of the vertical waveguide layer (6), and
wherein on both sides of each of the output ports (3,4) the waveguide splitter (1) has been etched down through a portion of, or all of the top layer (7) but through less than half of the vertical waveguide layer (6).

19. An optical waveguide splitter (1) with a symmetric splitting power ratio having one input port (2) and two output ports (3,4), which waveguide splitter is a rectangular Multi Mode Interference (MMI) type splitter, comprising:

a substrate (5); and
one or more vertical waveguide layers or materials that have been deposited upon or diffused into the substrate (6), said layers or materials forming a profile of the refractive index that supports the propagation of light in a plane that is substantially parallel to the substrate (parallel to the X and Z directions),
wherein said waveguide splitter contains one input waveguide and two output wave guides only,
wherein, on both sides of the input port (2), waveguide sidewalls terminate at a depth (Y-direction) that is deeper than a location of a peak intensity of the optical beam or guided mode that transports most or all of the propagating light energy within the input port,
wherein waveguide sidewalls on both sides of each output port (3, 4) terminate at a depth that is shallower than the location of the peak intensity of the mode or optical beam that transports the majority of the light energy within each given output port, and
wherein a MMI region rectangular profile is modifiable in areas that are substantially removed from the areas and interfaces where light propagates and reflects, to facilitate photolithographic mask alignment or other aspects of circuit fabrication, utilization, or appearance.

20. The optical waveguide splitter (1) according to claim 19,
wherein, on both sides of the input port (2) the waveguide splitter (1) has been etched down at least through a top layer (7) and at least half of the vertical waveguide layer (6), and
wherein on both sides of each of the output ports (3,4) the waveguide splitter (1) has been etched down through a portion of, or all of the top layer (7) but through less than half of the vertical waveguide layer (6).

* * * * *